May 26, 1964 H. M. BIRCH ETAL Re. 25,585

SELF-CONTAINED PUSH BUTTON APPLICATOR

Original Filed June 12, 1959 2 Sheets-Sheet 1

INVENTORS
HERBERT M. BIRCH
DANIEL H. GATTONE

BY Herbert M. Birch
ATTORNEY

SELF-CONTAINED PUSH BUTTON APPLICATOR

Original Filed June 12, 1959 2 Sheets-Sheet 2

INVENTORS
HERBERT M. BIRCH
DANIEL H. GATTONE

BY Herbert M. Birch
ATTORNEY

United States Patent Office

Re. 25,585
Reissued May 26, 1964

25,585

SELF-CONTAINED PUSH BUTTON APPLICATOR

Herbert M. Birch, 5605 Midwood Road, Bethesda, Md., and Daniel H. Gattone, Bethesda, Md. (4409 Dermond Ave., Drexel Hill, Pa.)

Original No. 2,998,822, dated Sept. 5, 1961, Ser. No. 819,964, June 12, 1959. Application for reissue Aug. 21, 1963, Ser. No. 303,964
6 Claims. (Cl. 132—116)

Matter enclosed in heavy brackets [ ] appears in the original patent but forms no part of this reissue specification; matter printed in italics indicates the additions made by reissue.

The present invention relates to a push-button control applicator means for discharge of the contents from a disposable pressurized unit, and is an improvement of our prior co-pending application Serial No. 653,147, filed April 16, 1957, now abandoned.

Heretofore many arrangements have been devised to apply shampoo, hair tonic, hair grooming compositions, medications, cosmetics and the like to the hair, scalp or face, for example by actual application with the hands, by gravity discharging applicators and by squeeze-type containers. Each of these applicating means and methods is satisfactory only because no other more efficient means and less messy manner of application is known to the users.

It is an object of this invention to provide a novel more efficient and effective system and apparatus for applying ingredients, compositions and the like to the hair, scap or face of a person.

Another object is to provide in combination an assembled self-contained device operable as a unit, comprised of an applicator with a self-contained disposable pressurized cartridge manually under control of the user himself, such assembled unit for example including a hair brush, scalp treating or shampoo device, comb, facial pad or the like.

Another object is to provide a novel pressurized cartridge per se with a metered valve for insertion in a portion of a novelly formed applicator member.

A further object is to provide in combination an applicator, such as a hair brush, comb or facial pad formed with a cartridge chamber, and a pressure loaded cartridge with an axially movable meter valve arrangement adapted to be manually opened by a push button to supply a metered quantity of the cartridge contents to the applicator while it is being used.

Still a further object is to provide, in combination, an applicator with a self-contained pressure loaded cartridge and a push-button control operating arrangement therefor, wherein said push-button control is positioned in the end of the handle so as not to be accidentally operated during use.

With these and other objects in view, the present novel system and apparatus consists in the novel construction, arrangement, and combination of parts described in the following specification and illustrated in the accompanying drawings, wherein three embodiments of this invention are disclosed, as means to practice the same.

In the drawings, wherein like reference characters refer to like parts on the figures.

Figure 1:
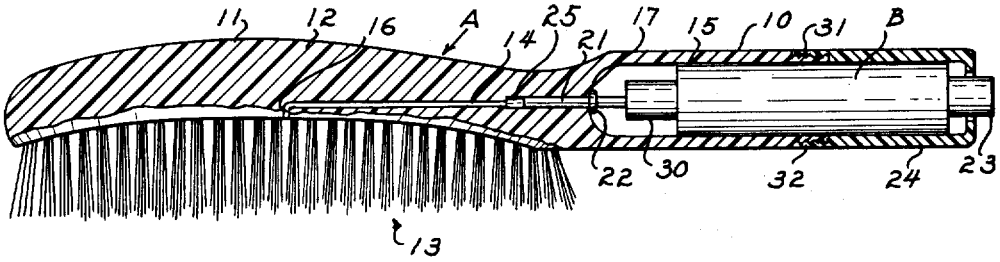
FIGURE 1 is a longitudinal cross-section view of one form of applicator, namely a hair brush, illustrating the aerosol self-contained cartridge and the manual push-button control therefor.

Referring to the drawings and first with reference to FIGURE 1, there is disclosed a brush A with a handle 10 and a head 11 having a solid back portion 12 and a front bristle portion 13. The material of the brush is preferably of plastic, such as Lucite or some acrylic resin product and the handle 10 is bored and counterbored through into the head portion 11 to provide a duct 14 in the head and a relatively larger bore in the handle to provide a cartridge chamber 15. Leading off from the duct 14 is a relatively smaller duct 16, which opens into the flat front face of bristle portion 13, see FIGURE 2.

The junction between the duct 14 and the chamber 15 provides an annular shoulder 17. This shoulder serves as an abutment for an operating element 22 formed on valve stem 21 of a replaceable and disposable aerosol or pressurized cartridge B, see FIGURE 3, filled with any suitable composition, such as shampoo, tonic, hair grooming cream, or facial liquid, cream or lotion. The cartridge B includes the usual spring closed valve 30 and the spring of said valve may be compressed when the pinched or bulged portion 22 on the movable hollow valve stem 21 is forced against the abutment 17, that is, when the cartridge body B is moved forward by a push-button or push-stud 23 formed on the free end of the cartridge B, see FIGURES 1–3. This push-button or push-stud 23 projects from the apertured end of a cap 24 and is freely reciprocable in said end cap 24, which is threadedly mounted on the end of the hollow handle 10.

Any suitable meter type valve arrangement may be used, such as that illustrated and described in our co-pending application Serial No. 647,352, filed March 20, 1957, now Patent No. 2,872,923, or such as illustrated in Patent No. 2,746,796, granted May 22, 1956, or in Patent No. 2,721,010. Also, if desired a valve, such as disclosed in our Patent No. 2,788,784, issued April 16, 1957, may be used.

The end of the handle 10 is formed with threads 31 to receive the threads 32 of the cap 24, said cup being formed with an opening for extension therethrough of the push member or extension 23. This cap 24 is removable to permit the insertion and removal of an aerosol cartridge B when desired. Such cartridges thus are replaceable when empty and interchangeable and may be loaded with many different kinds of tonics, shampoos, medications and the like. Also, if desired the cartridges may be used independently, that is, without any applicator by manually pushing in the valve stem 21 by pushing on the element 22 formed on valve stem 21.

GENERAL OPERATION

When it is desired to use the brush A for a hair grooming operation, the same is loaded with an aerosol cartridge B filled with a desired hair groom or tonic by unscrewing the cap 24 and inserting the same so the element 22 rests on the abutment 17 with the valve stem 21 extending beyond the abutment 17 into the duct 14. Then the cap 24 is replaced on the end of the handle with the extension 23 extending through the cap opening.

Now when the brush is used, it may be used as a normal brush or if the hair is dry and needs grooming or tonic, then the push-button 23 is manually pressed, and the spring of valve 30 is compressed by the operating element 22 and abutment or shoulder 17, thereby opening the valve for the meter chamber of the meter valve system, to discharge a metered or predetermined dosage of tonic or the like from the aerosol cartridge under pressure into the ducts 14—25 and out of port 16 onto the user's head and possibly onto a portion of the bristles of the brush. The brush is then used in the usual manner and if desired the push-button 23 may be pushed and repushed to discharge another metered amount of hair groom, tonic or the like.

Figure 4:
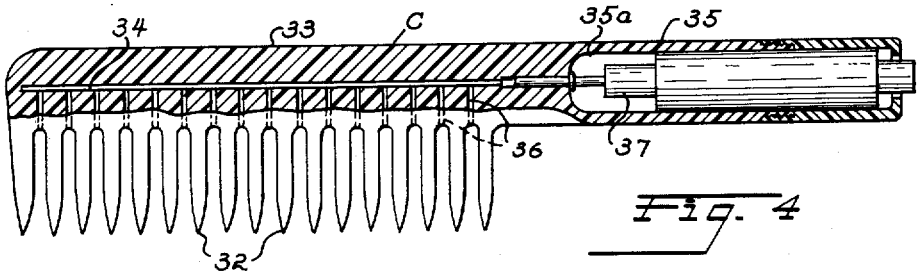
FIGURE 4 is a longitudinal cross-section view of a second embodiment of the invention, illustrating a comb in place of the brush of FIGURES 1 and 2.
Figure 5:
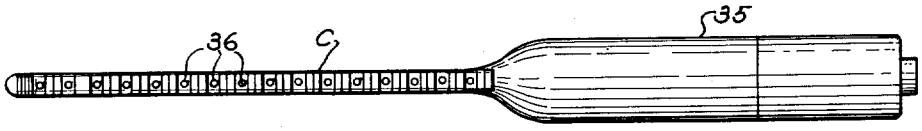
FIGURE 5 is a bottom plan view of the comb of FIGURE 4.
Figure 6:
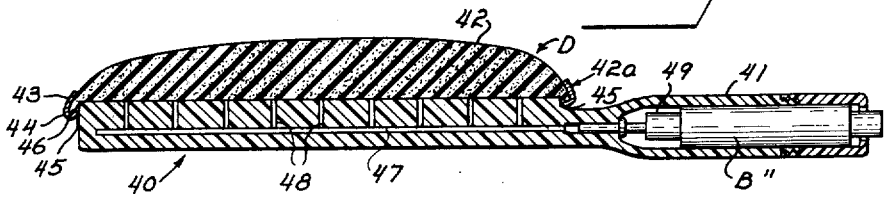
FIGURE 6 is a longitudinal cross-section view of a facial applicator.

The same general arrangement may be provided for a comb as illustrated in FIGURE 4. For example, a comb C with the usual teeth 32 is shown, said comb having a back portion 33 formed with a duct 34 leading from a handle 35 internally bored identically to the handle of the brush shown in FIGURES 1 and 2, to provide a cartridge chamber 35[a]. The comb teeth 32 at the apices thereof are each formed therebetween with a discharge orifice 36 opening from the duct 34. Thus when the spring closed meter valve 37 is actuated the pressurized treating medium is ejected from these orifices between the comb teeth onto the hair and scalp. The hair may then be combed to provide a well groomed appearance or to receive the benefits of a medicated tonic or the like.

Figure 2:
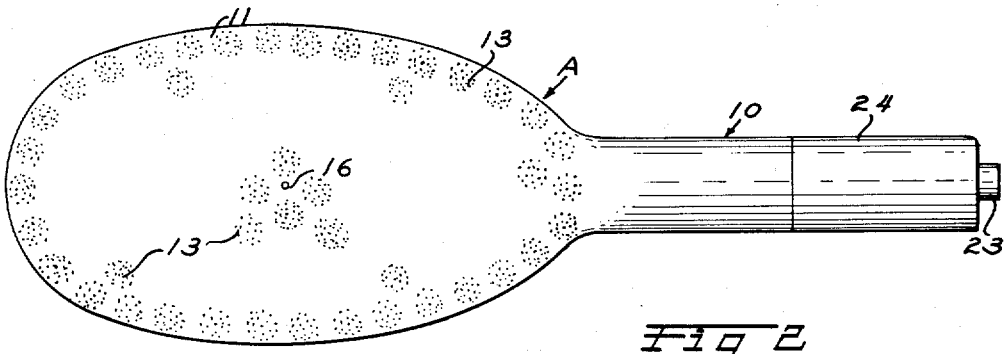
FIGURE 2 is a bottom plan view of FIGURE 1.
Figure 7:
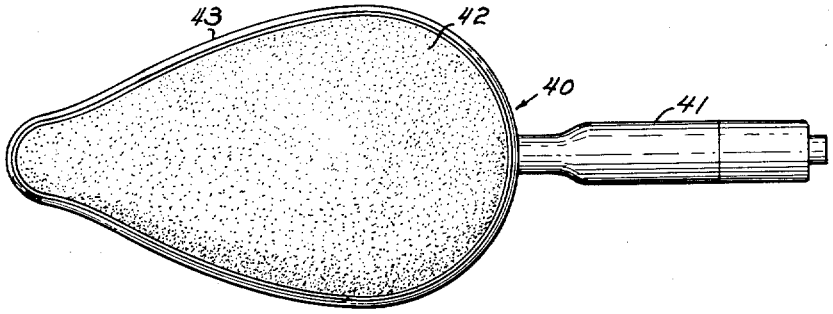
FIGURE 7 is a top plan view of FIGURE 6.

A third embodiment of the invention is illustrated in connection with a facial applicator D, which comprises a head portion 40 and a handle portion 41 bored in the manner of FIGURES 1 and 2, so as to house a pressurized cartridge B″ of cosmetics, such as facial creams, liquid or lotions. The head portion 40 is preferably tear-drop shaped as shown in FIGURE 7, to thereby permit more efficient use thereof around the nose and cheeks of the user, for example. The pad material 42 of the portion 41 may be of any suitable replaceable throw-away porous material, such as sponge, foam rubber, multiple layers of cloth or the like. Such material is removably mounted on the head portion 40 by the use of a soft plastic clamping or retaining ring 42[a] formed with a lapping retainer flange 43 and a depending annular skirt 44, which skirt is formed with an upturned snap on catch 45. The outer wall of head portion 40 around its upper peripheral edge is formed with a complementary reversely directed catch 46, so that the ring 42[a] when pushed downward over the facial padding will cause catches 45 and 46 to snap-lock together.

The head portion 40 is formed with a duct 47 and a plurality of discharge ducts 48, which direct the pressurized discharge of facial liquids, lotions and creams against the underside of the padding, to thereby saturate and filter therethrough to the outer face engaging surface of the padding.

The meter valve 49 of the cartridge B″ for this unit is operated in the same manner as previously described in connection with the brush applicator disclosed in FIGURES 1 and 2.

Thus there is provided a novel, efficient and economical system for applying medicaments, tonic, shampoo, beauty [locations] *lotions* and various forms of hair creams and the like to the hair, scalp, or face under pressure, which is self-contained and which permits interchangeable and/or disposable use of individual novel aerosol or pressurized cartridges. These cartridges are aerosol or pressurized containers, which may be sold as separate refill units and in some instances may be used without an applicator and may have a manually controlled valve which is either metered or not metered as desired.

Furthermore all old-fashioned bulbs, squeeze bottles and the like are eliminated and replaced by this novel push-button applicator system.

Figure 3:
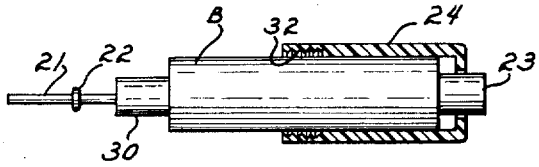
FIGURE 3 is an elevational view of the aerosol cartridge per se with the meter valve system.

In addition to medicaments, hair tonics and shampoo formulas, this arrangement is applicable to toothbrush and tooth paste cartridges. For example, containers of tooth paste pressurized with an inert gas, such as nitrogen and the like, may be utilized with a brush means in the same manner as illustrated in FIGURES 1, 2 and 3 of the drawings.

While only a few embodiments of the invention are specifically shown and described in detail, it is to be expressly understood that there may be many changes made in the forms and shapes of the applicators and the containers and in the propellants used without departing from the concept of this invention.

To determine the scope of the invention, reference should be had to the appended claims.

What is claimed is:

1. In combination, an applicator having a head portion with a plurality of discharge ducts, a handle connected to said head portion having a chamber therein, an annular shoulder defining the juncture of the said head portion and said handle and a counterbored reduced conduit in said head portion extending from said shoulder to, and communicating with said discharge ducts, said applicator having a relatively larger cross-sectional area than said handle and said ducts extending laterally with respect to said counterbored reduced conduit, and a pressurized container disposed within said chamber having a product to be discharged through said ducts, said container having a valve with a hollow valve stem, said stem having a discharge outlet communicating with said reduced conduit and said ducts and means engaging said shoulder, said valve being normally maintained closed by means of a spring and the pressure in said container, said valve controlling the discharge of the pressurized product from the said pressurized container through said valve stem into the said applicator discharge ducts, and a push button operatively associated with said container to move the same projecting from an opening in a portion of said handle, whereby the said valve may be opened against the resistive action of said spring and said container pressure by movement of said means on said container while said valve stem is engaged with said shoulder in the applicator.

2. Means for topical treatment comprising an applicator with a brush portion having a head portion with a discharge duct, a handle connected to said head portion of the brush portion having a chamber therein, an annular shoulder defining the juncture of the said head portion and said handle and a counterbore reduced conduit in said head portion extending from said shoulder to, and communicating with said discharge duct, said brush portion having a relatively larger cross-sectional area than said handle and said duct extending laterally with respect to said counterbore reduced conduit and terminating in said brush portion, and a replaceable pressurized cartridge disposed within said chamber having a product to be discharged through said duct, said cartridge having a valve with a hollow valve stem, said stem having a discharge outlet communicating with said reduced conduit and said duct and means engaging said shoulder, said valve being normally maintained closed by means of a spring and the pressure in said cartridge, said valve controlling the discharge of the pressurized product from the said pressurized cartridge through said valve stem into the said brush discharge duct, and a push button operatively associated with said cartridge to move the same projecting from an opening in a portion of said handle, whereby the said valve may be opened against the resistive action of said spring and said cartridge pressure by movement of said means on said cartridge while said valve stem is engaged with said shoulder in the brush.

3. In combination, a comb having a head portion with a plurality of discharge ducts terminating between the respective teeth of the comb, a handle connected to said head portion having a chamber therein, an annular shoulder defining the juncture of the said head portion and said handle and a counterbored reduced conduit in said head portion extending from said shoulder to, and communicating with said discharge ducts between the comb teeth, and said ducts extending laterally with respect to said counterbored reduced conduit, and a disposable pressurized container disposed within said chamber having a product to be discharged through said ducts outwardly between the comb teeth, said container having a valve with a hollow valve stem, said stem having a discharge outlet communicating with said reduced conduit and said ducts and means engaging said shoulder, said valve being normally maintained closed by means of a spring and the pressure in said container, said valve controlling the discharge of the pressurized product from the said pressurized container through said valve stem into the said comb discharge ducts, and a push buttton operatively associated with said container to move the same projecting from an opening in a portion of said handle, whereby the said valve may be opened against the resistive action of said spring and said container pressure by movement of said means on said container while said valve stem is engaged with said shoulder in the said head portion of the comb.

4. In combination, an applicator having a tear-drop shaped head portion with a plurality of discharge ducts, a covering of porous material secured over said ducts, a handle connected to said head portion having a chamber therein, an annular shoulder defining the juncture of the said head portion and said handle and a counterbored reduced conduit in said head portion extending from said shoulder to, and communicating with said discharge ducts, said applicator having a relatively larger cross-sectional area than said handle and said ducts extending laterally with respect to said counterbored reduced conduit, and a pressurized container disposed within said chamber having a product to be discharged through said ducts, said container having a valve with a hollow valve stem, said stem having a discharge outlet communicating with said reduced conduit and said ducts and means engaging said shoulder, said valve being normally maintained closed by means of a spring and the pressure in said container, said valve controlling the discharge of the pressurized product from the said pressurized container through said valve stem into the said applicator discharge ducts and into the said porous covering, and means operatively associated with said container to move the same projecting from an opening in a portion of said handle, whereby the said valve may be opened against the resistive action of said spring and said container pressure by movement of said means on said container while said valve stem is engaged with said shoulder in the applicator.

5. In combination, an applicator having a head portion with [a plurality of discharge ducts] *discharge duct means,* a handle connected to said head portion having a chamber therein, an annular shoulded defining the juncture of the said head portion and said handle and a counterbored reduced conduit in said head portion extending from said shoulder to, and communicating with said discharge [ducts] *duct means,* [ said applicator having a relatively larger cross-sectional area than said handle and] said [ducts] *duct means* extending laterally with respect to said counterbored reduced conduit, and a pressurized container disposed within said chamber having a product to be discharged through said [ducts] *duct means,* said container having an axially movable meter valve with a hollow valve stem, said stem having a discharge outlet communicating with said reduced conduit and said [ducts] *duct means* and an intermediate relatively wider [pinched]

portion engaging said shoulder, said valve being normall maintained closed by means of a spring and the pressu in said container, said valve controlling the discharge the pressurized product from the said pressurized co tainer through said valve stem into the said applicat discharge [ducts] *duct means,* and a push button ope atively associated with said container to move the sam projecting from an opening in a portion of said handl whereby the said valve may be opened against the resisti action of said spring and said container pressure by mov ment of said [means] *push button* on said container whi said wider [pinched] portion of said valve stem is engag with said shoulder in the applicator to supply a metere quantity of the container contents to the applicator fro said hollow valve stem into said [ducts] *duct means.*

6. In combination, an applicator having a head portic with [a plurality of discharge ducts] *discharge du means,* a handle connected to said head portion having chamber therein, an annular shoulder defining the jun ture of the said head portion of said handle and a cou terbored reduced conduit in said head portion extendi from said shoulder to, and communicating with sa [discharge ducts] *duct means,* [said applicator having relatively larger cross-sectional area than said hand and] said [ducts] *duct means* extending laterally with r spect to said counterbored reduced conduit, and a sel contained pressurized disposable container disposed with said chamber having a product to be discharged throu said [ducts] *duct means,* said container having a val with a hollow valve stem, said stem having a dischar outlet communicating with said reduced conduit and sa [ducts] *duct means* and [an intermediate enlargemen *said stem having means for* engaging said shoulder, sa valve being normally maintained closed by means of spring and the pressure in said container, said valve co trolling the discharge of the pressurized product from t said pressurized container through said valve stem into t said applicator [discharge ducts] *duct means,* and mea operatively associated with said container to move t same projecting from an opening in a portion of sa handle, whereby the said valve may be opened against t resistive action of said spring and said container pressu by movement of said means [on] *operatively associat with* said container while [said enlargement on] *the e gaging means of* said valve stem is engaged with sa shoulder in the applicator.

References Cited in the file of this patent or the original patent

UNITED STATES PATENTS

| | | |
|---|---|---|
| 753,968 | Farmer | Mar. 8, 19 |
| 2,295,746 | Metzler | Sept. 15, 19 |
| 2,617,431 | Gaspari | Nov. 11, 19 |
| 2,756,908 | Miller | July 31, 19 |
| 2,788,925 | Ward | Apr. 16, 19 |
| 2,790,190 | Mastrandrea | Apr. 30, 19 |
| 2,914,222 | Meshberg | Nov. 24, 19 |
| 3,021,850 | Smith et al. | Feb. 20, 19 |
| 3,094,130 | Wiener | June 18, 19 |

FOREIGN PATENTS

| | | |
|---|---|---|
| 822,718 | Germany | Nov. 26, 19 |